United States Patent
Burke et al.

(10) Patent No.: US 12,379,236 B2
(45) Date of Patent: Aug. 5, 2025

(54) TEMPERATURE AND PRESSURE RELIEF VALVE

(71) Applicant: Watts Regulator Co., North Andover, MA (US)

(72) Inventors: Joseph Michael Burke, Deerfield, NH (US); Yousef S. Almesad, Boston, MA (US)

(73) Assignee: Watts Regulator Co., North Andover, MA (US)

( * ) Notice: Subject to any disclaimer, the term of this patent is extended or adjusted under 35 U.S.C. 154(b) by 133 days.

(21) Appl. No.: 18/321,321

(22) Filed: May 22, 2023

(65) Prior Publication Data
US 2023/0375385 A1   Nov. 23, 2023

Related U.S. Application Data

(63) Continuation of application No. 16/673,207, filed on Nov. 4, 2019, now Pat. No. 11,703,364.
(Continued)

(51) Int. Cl.
   *G01F 1/56* (2006.01)
   *F16K 17/00* (2006.01)
   (Continued)

(52) U.S. Cl.
   CPC .............. *G01F 1/56* (2013.01); *F16K 17/003* (2013.01); *F24D 19/1006* (2013.01);
   (Continued)

(58) Field of Classification Search
   CPC .............. F24D 19/082; F24D 19/1051; F24D 19/1006; F17D 5/02; F17D 5/00;
   (Continued)

(56) References Cited

U.S. PATENT DOCUMENTS

| | | |
|---|---|---|
| 2,634,748 A | 4/1953 | Morrison |
| 2,638,109 A | 5/1953 | Wahlmark |
| (Continued) | | |

FOREIGN PATENT DOCUMENTS

| | | | |
|---|---|---|---|
| CA | 3065374 A1 * | 12/2018 | .............. A47J 31/32 |
| CN | 204039374 U * | 12/2014 | |
| (Continued) | | | |

OTHER PUBLICATIONS

Electromagnetic Flow Meter, Flow Meter Types & Principles, 2018, pp. 105, Chapter 2, Keyence America.
(Continued)

*Primary Examiner* — Brian A Zimmerman
*Assistant Examiner* — Anthony D Afrifa-Kyei
(74) *Attorney, Agent, or Firm* — Day Pitney LLP; George Chaclas; Anthony A. Kassas (57) ABSTRACT

A temperature and pressure relief valve apparatus including a body having a first conduit connected to a water heater and a second conduit connected to a discharge pipe. A valve member, positioned between the first and second conduits, is normally biased closed to prevent flow between the conduits. The valve member is configured such that when a temperature or pressure within the water heater exceeds a predetermined level, the valve member opens to relieve pressure and, in turn, water is released through the second conduit. A sensor is disposed about the second conduit and coupled to a controller. The controller measures a capacitance value of the second conduit, detects a change in the capacitance value indicating a presence of water in the second conduit, and asserts an alarm condition upon detection of the change in the second conduit capacitance value.

17 Claims, 9 Drawing Sheets

Related U.S. Application Data (60) Provisional application No. 62/755,857, filed on Nov. 5, 2018.

(51) Int. Cl.

| | | |
|---|---|---|
| *F24D 19/10* | (2006.01) | |
| *F24H 9/20* | (2022.01) | |
| *F24H 15/12* | (2022.01) | |
| *F24H 15/20* | (2022.01) | |
| *F24H 15/212* | (2022.01) | |
| *F24H 15/238* | (2022.01) | |
| *F24H 15/242* | (2022.01) | |
| *F24H 15/31* | (2022.01) | |
| *F24H 15/395* | (2022.01) | |
| *G01F 15/00* | (2006.01) | |
| *G01M 3/26* | (2006.01) | |
| *F24H 15/45* | (2022.01) | |

(52) U.S. Cl.
CPC ........... *F24H 9/2007* (2013.01); *F24H 15/12* (2022.01); *F24H 15/20* (2022.01); *F24H 15/212* (2022.01); *F24H 15/238* (2022.01); *F24H 15/242* (2022.01); *F24H 15/31* (2022.01); *F24H 15/395* (2022.01); *G01F 15/005* (2013.01); *G01M 3/26* (2013.01); *F24H 15/45* (2022.01)

(58) Field of Classification Search
CPC . F17D 5/04; F17D 5/06; F24H 15/223; F24H 15/238; F24H 15/242; F24H 15/269; F24H 15/31; F24H 15/355; F24H 15/395; F24H 15/45; F24H 15/486; F24H 9/16; F24H 9/2021; F24H 15/136; F24H 15/175; F24H 15/212; F24H 15/12; F24H 15/20; F24H 15/246; F24H 15/421; F24H 15/457; F24H 9/2007; G06Q 40/08; Y10T 137/1353; Y10T 137/1516; G01M 3/26; G01M 3/02; G01M 3/28; G01M 3/002; G01M 3/186; G01M 3/2807; G01M 3/2815; E03B 7/071; E03B 7/12; E03B 1/00; A62C 35/60; A62C 35/68; A62C 3/004; G05B 15/02; G05B 2219/2642; C02F 2209/008; C02F 2209/02; C02F 2209/03; Y02A 20/15; G01F 1/56; G01F 15/005; F16K 17/003
See application file for complete search history.

(56) References Cited

U.S. PATENT DOCUMENTS

| | | |
|---|---|---|
| 2,773,251 A | 12/1956 | Synder |
| 2,827,921 A | 3/1958 | Sherman et al. |
| 3,007,495 A | 11/1961 | Alfred |
| 3,069,671 A | 12/1962 | Taylor |
| 3,154,248 A | 10/1964 | Fulton et al. |
| 3,473,553 A | 10/1969 | Collins |
| 3,525,335 A | 8/1970 | Freeman |
| 3,695,104 A | 10/1972 | Mannherz et al. |
| 3,770,002 A | 11/1973 | Brown |
| 3,824,460 A | 7/1974 | Gustafson |
| 3,961,156 A | 6/1976 | Patton |
| 4,297,686 A | 10/1981 | Dale |
| 4,303,376 A | 12/1981 | Siekmann |
| 4,324,268 A | 4/1982 | Jacobson |
| 4,429,343 A | 1/1984 | Freud |
| 4,569,312 A | 2/1986 | Riddell et al. |
| 4,572,113 A | 2/1986 | Baughman |
| 4,675,596 A | 6/1987 | Smith |
| 4,677,371 A | 6/1987 | Imaizumi |
| 4,681,518 A | 7/1987 | Credle |
| 4,683,904 A | 8/1987 | Iltis |
| 4,747,364 A | 5/1988 | Horowitz |
| 4,804,947 A | 2/1989 | Geleziunas |
| 4,845,472 A | 7/1989 | Gordon et al. |
| 4,901,751 A | 2/1990 | Story et al. |
| 4,944,253 A | 7/1990 | Bellofatto |
| 5,081,422 A | 1/1992 | Shih |
| 5,101,799 A | 4/1992 | Davis et al. |
| 5,117,798 A | 6/1992 | Nozaki |
| 5,188,143 A | 2/1993 | Krebs |
| 5,287,086 A | 2/1994 | Gibb |
| 5,291,791 A | 3/1994 | Lucas et al. |
| 5,345,224 A | 9/1994 | Brown |
| 5,421,210 A | 6/1995 | Kobayashi et al. |
| 5,507,178 A | 4/1996 | Dam |
| 5,546,009 A | 8/1996 | Raphael |
| 5,588,462 A | 12/1996 | Mchugh |
| 5,613,420 A | 3/1997 | Glockemann |
| 5,632,302 A | 5/1997 | Lenoir, Jr. |
| 5,655,561 A | 8/1997 | Wendel et al. |
| 5,662,139 A | 9/1997 | Lish |
| 5,844,492 A | 12/1998 | Buffin, Sr. |
| 5,857,482 A | 1/1999 | Dowling et al. |
| 5,877,689 A | 3/1999 | D Amico |
| 6,003,536 A | 12/1999 | Polverari et al. |
| 6,009,762 A | 1/2000 | Ockleston |
| 6,025,788 A | 2/2000 | Diduck |
| 6,035,699 A | 3/2000 | Parlante |
| 6,052,841 A | 4/2000 | Mankin et al. |
| 6,084,520 A | 7/2000 | Salvucci |
| 6,131,552 A | 10/2000 | Paielli et al. |
| 6,186,169 B1 | 2/2001 | Mchugh |
| 6,263,896 B1* | 7/2001 | Williams .............. F16L 55/134 137/317 |
| 6,276,309 B1 | 8/2001 | Zeek |
| 6,335,690 B1 | 1/2002 | Konchin et al. |
| 6,341,622 B1 | 1/2002 | Mchugh |
| 6,369,714 B2 | 4/2002 | Walter |
| 6,445,565 B1 | 9/2002 | Toyoda et al. |
| 6,489,895 B1 | 12/2002 | Apelman |
| 6,494,231 B1 | 12/2002 | Fetz et al. |
| 6,499,961 B1 | 12/2002 | Wyatt et al. |
| 6,552,647 B1 | 4/2003 | Thiessen et al. |
| 6,639,517 B1 | 10/2003 | Chapman et al. |
| 6,741,179 B2 | 5/2004 | Young |
| 6,826,356 B1 | 11/2004 | Wanecski |
| 6,950,032 B1 | 9/2005 | Hewitt et al. |
| 7,032,435 B2 | 4/2006 | Hassenflug |
| 7,082,959 B1 | 8/2006 | Franklin |
| 7,292,155 B2 | 11/2007 | Vokey et al. |
| 7,299,819 B1 | 11/2007 | Fenton et al. |
| 7,549,435 B2 | 6/2009 | Walter |
| 7,605,710 B2 | 10/2009 | Crnkovich et al. |
| 7,753,071 B2 | 7/2010 | Wood |
| 7,821,411 B1 | 10/2010 | Ward |
| 7,970,494 B2 | 6/2011 | Fima |
| 8,281,426 B2 | 10/2012 | Hui |
| 8,578,770 B2 | 11/2013 | Cantolino et al. |
| 8,850,872 B2 | 10/2014 | Jarvie |
| 9,146,172 B2 | 9/2015 | Trescott |
| 9,265,980 B2 | 2/2016 | Johnson |
| 9,725,894 B2 | 8/2017 | Caux et al. |
| 2002/0101355 A1 | 8/2002 | Young |
| 2003/0020493 A1* | 1/2003 | Haase .................... G01F 1/712 324/664 |
| 2003/0066340 A1 | 4/2003 | Hassenflug |
| 2003/0192595 A1 | 10/2003 | Benson |
| 2003/0231024 A1 | 12/2003 | Luque |
| 2004/0045604 A1 | 3/2004 | Dunmire et al. |
| 2005/0255724 A1 | 11/2005 | Picco et al. |
| 2008/0179962 A1 | 7/2008 | Wood |
| 2010/0064773 A1 | 3/2010 | Meredith et al. |
| 2010/0095744 A1 | 4/2010 | Johnson |
| 2010/0108165 A1 | 5/2010 | Rodenbeck et al. |
| 2010/0133258 A1 | 6/2010 | Fima |
| 2011/0132474 A1 | 6/2011 | Reese et al. |
| 2011/0180044 A1 | 7/2011 | Fritsch |
| 2011/0291845 A1 | 12/2011 | Rice |
| 2012/0017367 A1 | 1/2012 | Reeder et al. |

(56) References Cited

U.S. PATENT DOCUMENTS

| | | | |
|---|---|---|---|
| 2012/0061331 A1 | | 3/2012 | Ghalib |
| 2013/0314235 A1 | | 11/2013 | Rogers |
| 2014/0230927 A1 | | 8/2014 | Schultz et al. |
| 2015/0348395 A1 | | 12/2015 | Trout |
| 2016/0049067 A1 | | 2/2016 | Hyland et al. |
| 2016/0083953 A1 | | 3/2016 | Caux et al. |
| 2016/0201814 A1 | | 7/2016 | Chen et al. |
| 2016/0341445 A1 | | 11/2016 | Deivasigamani et al. |
| 2017/0023141 A1 | | 1/2017 | Andersson |
| 2017/0113083 A1 | | 4/2017 | Ringer et al. |
| 2017/0146137 A1 | | 5/2017 | Koelzer |
| 2017/0295743 A1 | | 10/2017 | Brown et al. |
| 2017/0350867 A1 | * | 12/2017 | Eihusen ............ G06Q 10/20 |
| 2018/0010978 A1 | | 1/2018 | Bailey |
| 2018/0283563 A1 | | 10/2018 | Goto et al. |
| 2019/0022289 A1 | | 1/2019 | Pratt et al. |
| 2020/0032494 A1 | | 1/2020 | Trescott et al. |

FOREIGN PATENT DOCUMENTS

| | | | | |
|---|---|---|---|---|
| CN | 207609811 U | * | 7/2018 | |
| GB | 2428285 A | * | 1/2007 | ........... F24H 9/2028 |
| WO | 2001065212 A1 | | 9/2001 | |
| WO | 2010030838 A1 | | 3/2010 | |

OTHER PUBLICATIONS

European Search Report for European Patent Application No. 17162293.9 dated Aug. 25, 2017, 8 pages.

Extended European Search Report for European Patent Application No. 19206957.3, dated Jan. 29, 2020, 10 pages.

G. Gangl, et al, Influence of Measurement of Inaccuracies at a Storage Tank on Water Losses, IWA Water Loss Conference 2007, vol. II, 978-973-7681-26-3, pp. 474-484, ISBN, Bucharest Conference Proceedings.

EP Extended European Search Report and Written Opinion, EP Application No. 23170003.0, dated Jul. 14, 2023, 11 pages.

AGF Manufacturing, Inc., https://agfmfg.com/, "Inspector's Test Valves Valves for Single Story Buildings and other Applications Including Systems Requiring a Pressure Relief Valve", 2008, 5 pages.

AGF Manufacturing, Inc., https://agfmfg.com/, "Model 3011 Remote Inspector's Test for Single Story and other Applications Including Systems Requiring a Pressure Relief Valve", Aug. 2015, 2 pages.

AGF Manufacturing, Inc., https://agfmfg.com/, "Pressure Relief Valves Model 7000 & Model 7200", Mar. 2017.

AGF Manufacturing, https://agfmfg.com/, "TEST anDRAIN Model 2511A Valve Operating Instructions", 1987, 1 page.

* cited by examiner

TEMPERATURE AND PRESSURE RELIEF VALVE

CROSS-REFERENCE TO RELATED APPLICATIONS

This application claims the benefit and priority of U.S. Pat. No. 11,703,364, entitled "Fluid Discharge Event Detector", filed Nov. 4, 2019, which claims the benefit and priority of U.S. Provisional Patent Application Ser. No. 62/755,857, entitled "Detector For Sensing Fluid Leak Without Obstructing Flow", filed Nov. 5, 2018, each of which is incorporated herein by reference in their entirety for any purpose whatsoever.

FIELD OF THE DISCLOSURE

The subject disclosure relates to sensing a fluid discharge, such as water, from, for example, a tank via a temperature and pressure (T&P) relief valve. More particularly, a device including a capacitive sensor that detects a change in capacitance indicating there has been a fluid discharge by the valve. e.g., fluid drips and flowing fluid. In addition, the device detects fluid flow without obstructing the tow of fluid and that provides an indication of such discharge.

BACKGROUND OF THE DISCLOSURE

Generally, the ability to release fluid is designed in to many fluid systems for reasons including, for example, safety and contamination prevention. In one application, if the internal thermostat of a hot water heater becomes defective, the water can be heated to a temperature far exceeding the boiling point of 212° F. At this high temperature, there is the potential that this superheated water rapidly becomes steam and the pressure within the tank can increase beyond a point that the tank can withstand and, therefore, presents a risk of exploding. To put the potential danger in perspective, a 30 gallon water heater tank can explode with the same force as one pound of dynamite, which would destroy most of a house. As a result, hot water heaters are provided with T&P relief valves.

Once installed, the T&P relief valve is normally closed and opens in the event of excess pressure or temperature to relieve the potentially dangerous situation. When the valve opens, water from the hot water heater is expelled via a drain tube. In some applications there is a floor drain, however, in most there is not. The amount of water expelled is dependent on the type of condition that caused the relief event such that, at times, the water can be a slow drip whereas, at other times, the released water is fully flowing. It is desirable to sense for any discharged water and to provide an alert or alarm in order to provide faster repair service or minimize any water damage.

Additional examples of fluid systems that may leak water are shown in U.S. Pat. Nos. 7,753,071 and 10,127,790. Such systems may create an occasional ejection of some water or even the release of a significant amount of water.

The codes and regulations relevant to boiler and pressure vessel operation require that "no reducing coupling or other restriction shall be installed in the discharge line" for T&P valves. Accordingly, there is a need for sensing fluid discharge while not violating applicable codes.

SUMMARY

One aspect of the present disclosure is directed to a fluid discharge event detection apparatus comprising: a first conduit; a sensing conduit; a control valve, coupled between the first conduit and the sensing conduit, configured to activate and fluidly couple the first conduit and the sensing conduit to one another when the control valve detects at least one predetermined condition of a fluid within the first conduit; a sensor disposed about the sensing conduit. In addition, a controller, coupled to the sensor, is configured to: measure a capacitance value of the sensing conduit; detect a change in the sensing conduit capacitance value; and assert an alarm condition upon detection of the change in the sensing conduit capacitance value.

In one aspect, the controller can be further configured to: detect a rate of change of the capacitance value of the sensing conduit; and distinguish between an excess temperature condition and an excess pressure condition as a function of the detected rate of change of the capacitance value of the sensing conduit.

In one aspect, the control valve can comprise: a temperature and pressure relief valve configured to fluidly couple the first conduit and the sensing conduit to one another when at least one of: a pressure or a temperature of a fluid within the first conduit is greater than or equal to, respectively, a predetermined pressure threshold value or a predetermined temperature threshold value.

In one aspect, the control valve is configured to activate when at least one of: a pressure within the first conduit that is not within a predetermined range of pressure values is detected; and a temperature within the first conduit that is not within a predetermined range of temperature values is detected.

Another aspect of the present disclosure is directed to an apparatus for detecting a fluid discharge event, comprising: a sensing conduit having a first end configured to couple to a discharge conduit; a sensor disposed about the sensing conduit; and a controller, coupled to the sensor. The controller is configured to: measure a capacitance value of the sensing conduit; detect a change in the sensing conduit capacitance value; and assert an alarm condition upon detection of the change in the sensing conduit capacitance value.

Another aspect of the present disclosure is directed to a method of detecting a fluid discharge event, comprising: coupling a first end of a sensing conduit to a discharge conduit; disposing a sensor about the sensing conduit; measuring, with the sensor, a capacitance value of the sensing conduit; detecting a change in the sensing conduit capacitance value; and asserting an alarm condition upon detection of the change in the sensing conduit capacitance value.

BRIEF DESCRIPTION OF THE DRAWINGS

The various features and advantages of the present disclosure may be more readily understood with reference to the following detailed description taken in conjunction with the accompanying drawings, wherein like reference numerals designate like structural elements, and in which.

DETAILED DESCRIPTION

Aspects of the present disclosure, as described below, use capacitance measurement technology to detect a fluid discharge and/or fluid flow without obstructing the flowpath and can be applied in T&P relief or other applications where fluid is discharged in order to provide relief. The advantages, and other features of the technology disclosed herein, will become more readily apparent to those having ordinary skill in the art from the following detailed description of certain embodiments taken in conjunction with the drawings which set forth representative embodiments of the present technology and wherein like reference numerals identify similar structural elements. Directional indications such as upward, downward, right, left and the like are used with respect to the figures and not meant in a limiting manner.

In brief, the subject technology relates to any assembly that may leak fluid, for example, water, whether by design or expected failure, so that upon leakage or improper flow, notification of the flowing or dripping condition without obstructing the flow path is performed. For example, such a device may be a backflow prevention device like a vented backflow preventer, a water shutoff assembly for a flood detection device, a water heater and the like.

Figure 1:
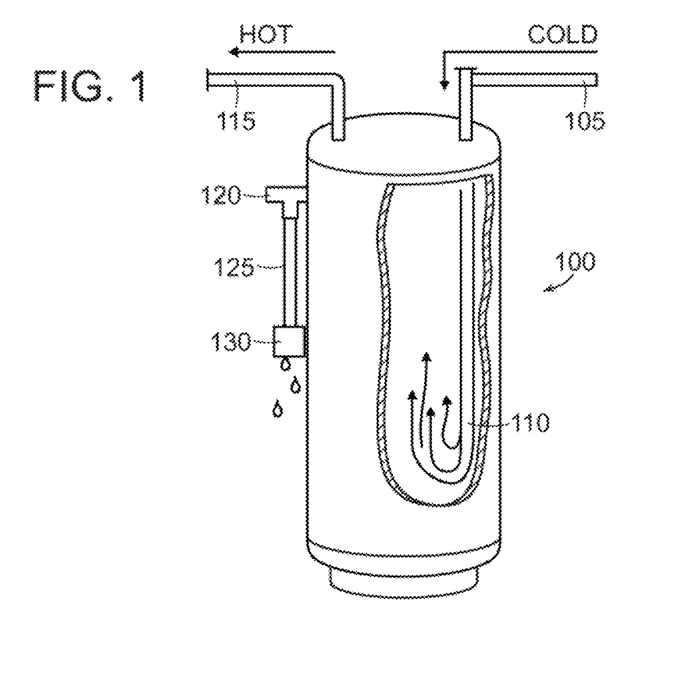
FIG. 1 is a fluid discharge detection assembly in accordance with an aspect of the present disclosure coupled to a known water heater.

One non-limiting example of an aspect of the present disclosure will be discussed with respect to FIG. 1. As shown in FIG. 1, a hot water heater 100, as is known, includes a cold water inlet 105 that feeds cold water to a tank 110. The water is heated in the tank 110 and provided via a hot water outlet 115. A T&P relief valve 120 connects to the tank 110 and, as known, operates to release fluid and, thereby, prevents pressure from building up. When the relief valve 120 releases water, the released water is carried away in a discharge pipe 125, oftentimes, to a drain in the floor.

In accordance with an aspect of the present disclosure, a fluid detection assembly 130 is coupled to the discharge pipe 125. The fluid detection assembly 130 is configured to detect water that may be flowing or present within the discharge pipe 125 where the presence of water is indicative of an over temperature or over pressure condition, as will be described below in more detail.

In an alternative aspect of the present disclosure, as will be discussed below, the fluid detection assembly 130 and the relief valve 120 can be incorporated into a single unit. Advantageously, in any arrangement, no portion of the fluid detection assembly 130, or any portion or component thereof, is placed in the flow path of the discharge pipe 125 in order to avoid the possibility of obstructing fluid flow.

Figure 10:
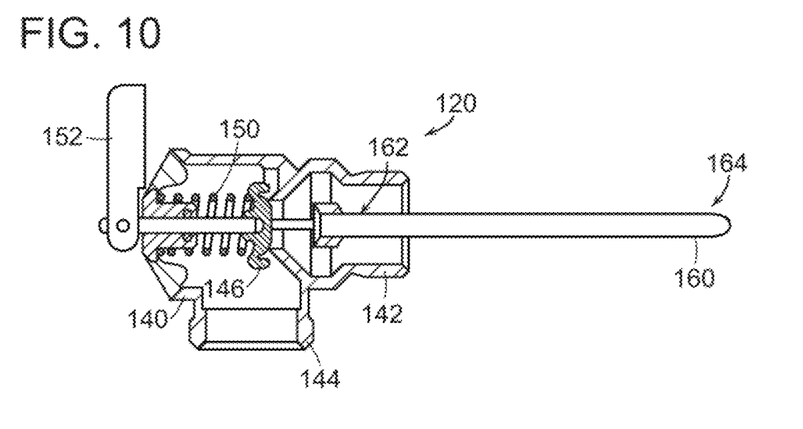
FIG. 10 is a cross-sectional view of a T&P valve.

Referring now to FIG. 10, the T&P relief valve 120 includes a body 140 having a first conduit 142 that connects to the water heater 110, and a second conduit 144 that connects to the discharge pipe 125. A valve member 146 is biased into a closed position by a compression spring 150 to prevent flow between the first conduit 142 and the second conduit 144. An expandable thermal actuator 160 is secured in the first conduit 142 so that a first end 162 engages the valve member 146 and a second end 164 extends into the water heater 110. The T&P relief valve 120 also includes a handle 152 connected to the valve member 146. When the pressure within the water heater 110 exceeds a predetermined level, the pressure at the first conduit 142 overcomes the compression spring 150 to move the valve member 146 and allow water to escape through the second conduit 144. Likewise, when temperature within the water heater 110 exceeds a predetermined level, the thermal actuator 160 expands and overcomes the compression spring 150 to move the valve member 146 and allow water to escape through the second conduit 144. The handle 152 can be used to manually test the T&P relief valve 120 by moving the valve member 146 to open the valve.

Figure 2:
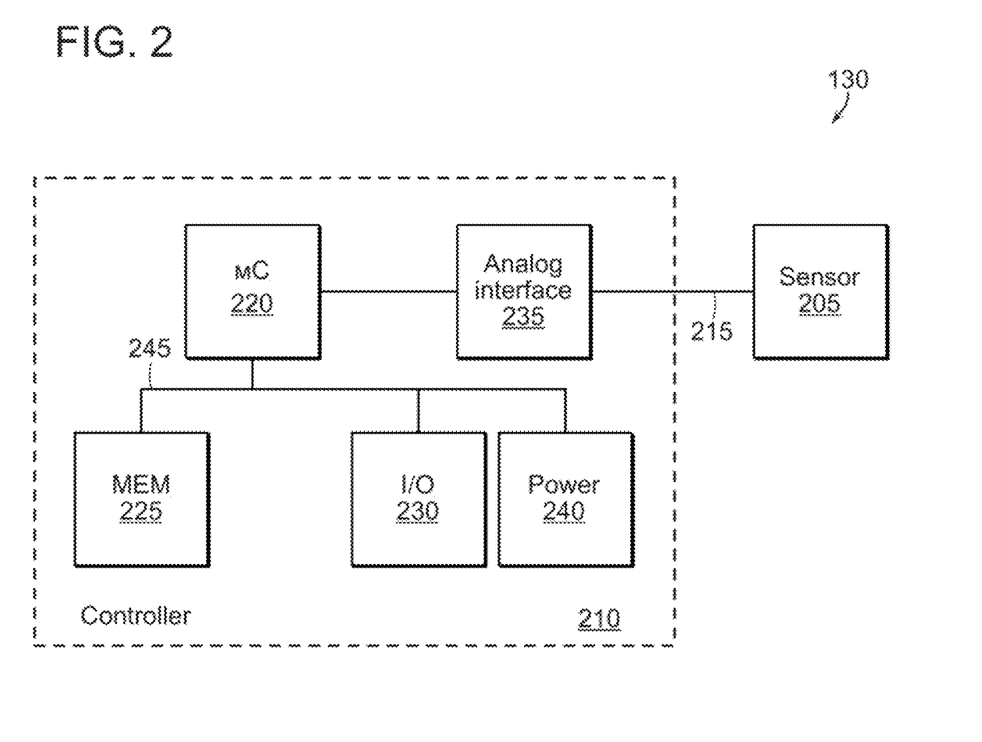
FIG. 2 is a block diagram of a fluid discharge detection assembly in accordance with an aspect of the present disclosure.

Referring now to FIG. 2, the fluid detection assembly 130 includes a sensor electrode 205 operative to generate a signal indicative of the presence of water or fluid in the discharge pipe 125. The sensor electrode 205 will be described in more detail below. The fluid detection assembly 130 also includes a controller 210 coupled to the sensor electrode 205 by an operative connection 215 such as, but not limited to, a wire. As such, the controller 210 receives a signal generated by the sensor electrode 205 for processing, as will be described below. The controller 210 can include: a processing unit 220, for example, a micro-controller such as an Arduino controller, memory 225, an I/O device 230, analog circuitry 235 including miscellaneous electrical components such as resistors, capacitors and the like to interface the sensor electrode 205 to the processing unit 220, a power source 240, e.g., a battery, or power connector to receive external power, all connected to one another by a bus 245 and all mounted on a printed circuit board (PCB), not shown. The controller 210 is configured to store, process and output data indicative of whether or not fluid is detected in the discharge pipe 125. An Arduino controller is an open-source hardware and software project and user community that designs and manufactures single-board microcontrollers and microcontroller kits for building digital and interactive devices that can sense and control objects in the analog and digital domains.

Figure 3:
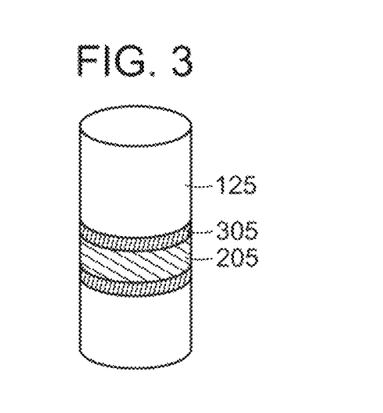
FIG. 3 shows an exemplary embodiment of a fluid discharge detection assembly in accordance with an aspect of the present disclosure.

Referring to FIG. 3, in one non-limiting example, the sensor electrode 205 is positioned around the discharge pipe 125 but is not within the discharge pipe 125 and, therefore, is never in contact with any fluid that might be within. Accordingly, the sensor electrode 205 can be encapsulated or insulated by a wall portion 305 of the discharge pipe 125, i.e., placed within the material of the discharge pipe 125. The sensor electrode 205 can be a circular ring, or portion of a ring, that surrounds the discharge pipe 125. The sensor electrode 205 may be made from copper or any suitable metal or material.

The sensor electrode 205 can comprise any conductive material wrapped around the discharge pipe 125 that is made of a material with a low dielectric constant. The materials are selected to create as large as a difference between the dielectric constant of the sensor electrode 205 and the discharge pipe 125. Air has a dielectric constant, for most purposes, of one, whereas water is closer to 80, while most plastics are generally no higher than five.

Capacitive sensing technology is known and applied in many common applications, e.g., smartphone touch screens, proximity detection devices and keyboards. Capacitive sensors utilize Gauss' law for electricity:

$$\oint \overline{E} \cdot d\overline{A} = \frac{q}{\varepsilon_0}$$

For two parallel plates, this simplifies down to:

$$C = (k * \varepsilon_0 * A)/d$$

where:
C=capacitance (farads)
k=relative permittivity of material between two plates (unitless)
$\varepsilon_0$=permittivity of space ($8.854 * 10^{-12}$ F/m)
d=separation between two parallel plates (m)

Accordingly, with a fixed sensor area, the following parameters will affect the RC time constant producing a reading: a distance between the sensor and the target object/ground electrode; a dielectric constant of the target object; and an area of the target object.

In operation, as discussed below, the fluid detection assembly 130 continuously, i.e., periodically, measures a capacitance value of the discharge pipe 125 with the sensor 205. A change in the measured capacitance value, e.g., greater than a predetermined threshold value or outside a predetermined range of values, may be indicative of fluid in the discharge pipe 125 as the measured capacitance is a function of an amount of fluid within the discharge pipe 125.

Figure 4:
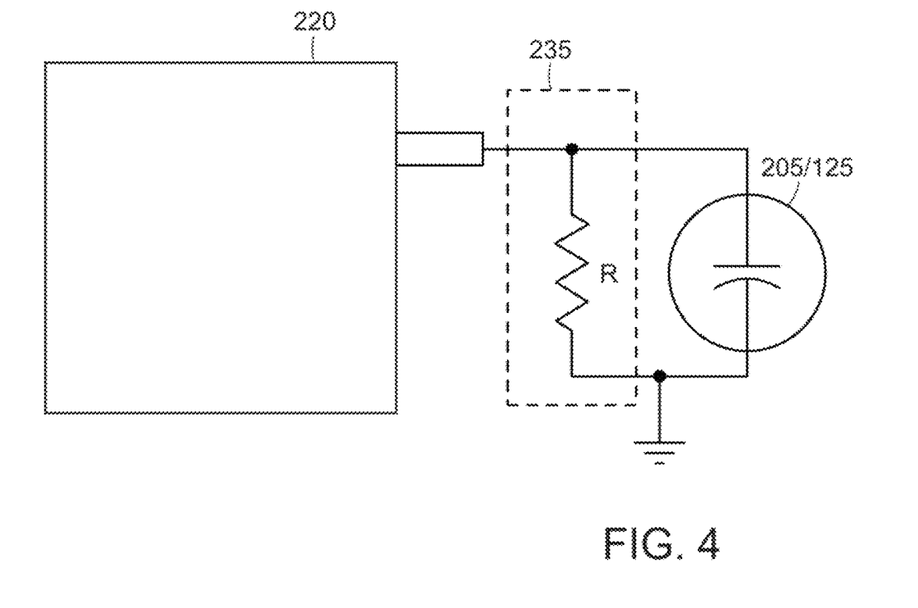
FIG. 4 is a conceptual representation of the operation of the fluid discharge detection assembly in accordance with an aspect of the present disclosure.

Referring to FIG. 4, the time constant in the sensor/discharge pipe combination 205/115 in accordance with an aspect of the present disclosure, is analogous to that in an RC circuit, and will be the resistance of the line multiplied by the combined capacitance. The sensor electrode 205 forms a capacitance with the surrounding ground and its size and shape will affect the flux field orientation, and the sensing distance. The surrounding ground could be a ground plate, the surrounding structure/plumbing or a target object. It should be noted that in most residential water supply systems, the piping through which the water flows is coupled to ground and, therefore, the water is also coupled to ground. In operation, the capacitor is cyclically charged and the discharge time is constantly recorded or stored, i.e., how long the capacitor takes to discharge, which is representative of the capacitance. As the measured capacitance for a "dry" discharge pipe 125 will be different from a "wet" discharge pipe 125, the presence of fluid, specifically, water, can be detected.

The circuit consists of a capacitor and a resistor connected in parallel, both going to ground. The processing unit 220 cyclically switches between send and receive states, while measuring the time it takes for discharge. The sensitivity can be adjusted as necessary by altering the resistance, changing the discharge time for a given capacitance and altering what the clock can and cannot pickup. The maximum distance sensed and the amounts of discharge cycles that occur per unit time are inversely proportional.

Figure 5:
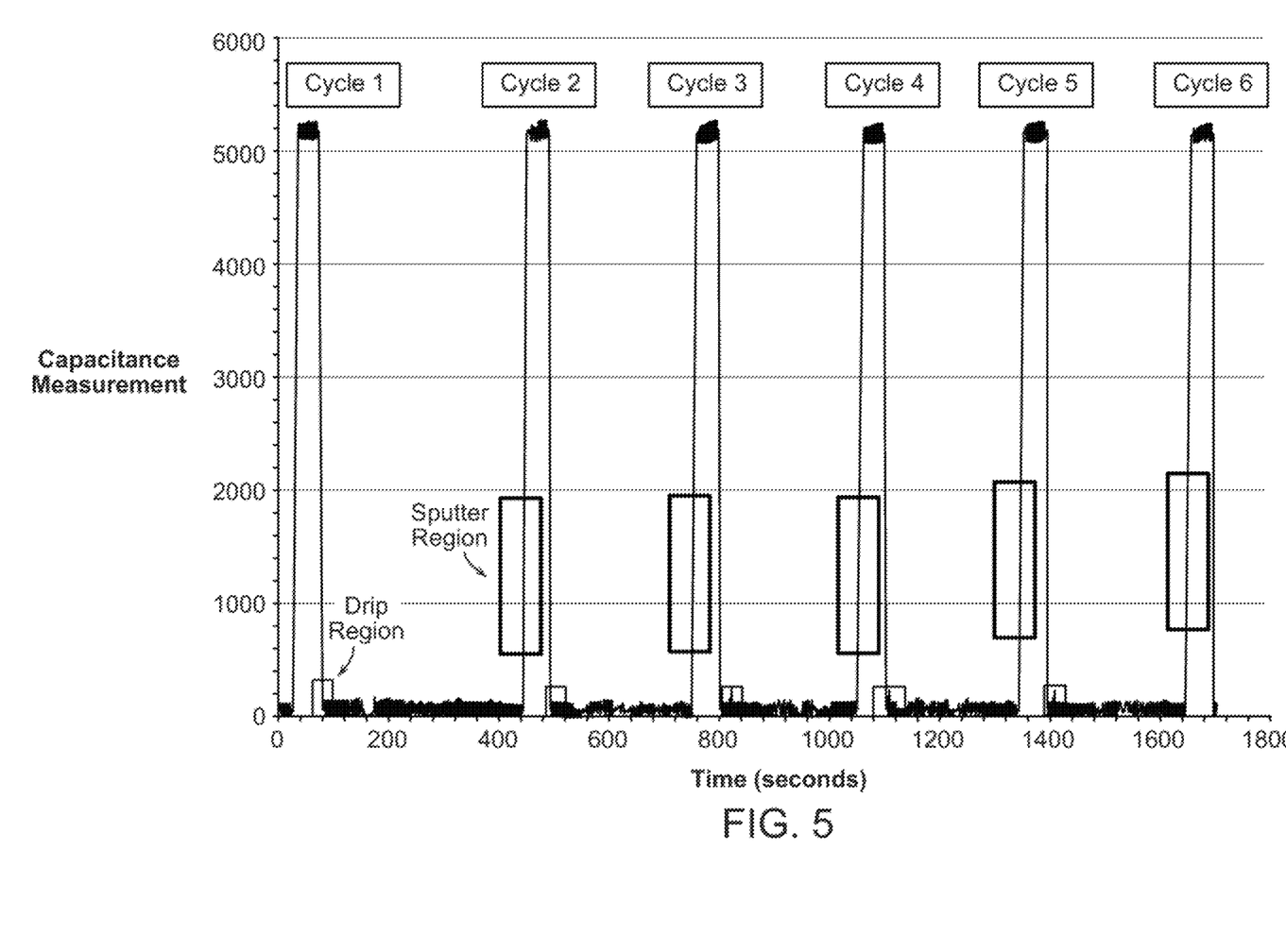
FIG. 5 is a graph representing capacitance values versus time detected during a cyclic fluid discharge event occurring when a T&P valve releases fluid.
Figure 6:
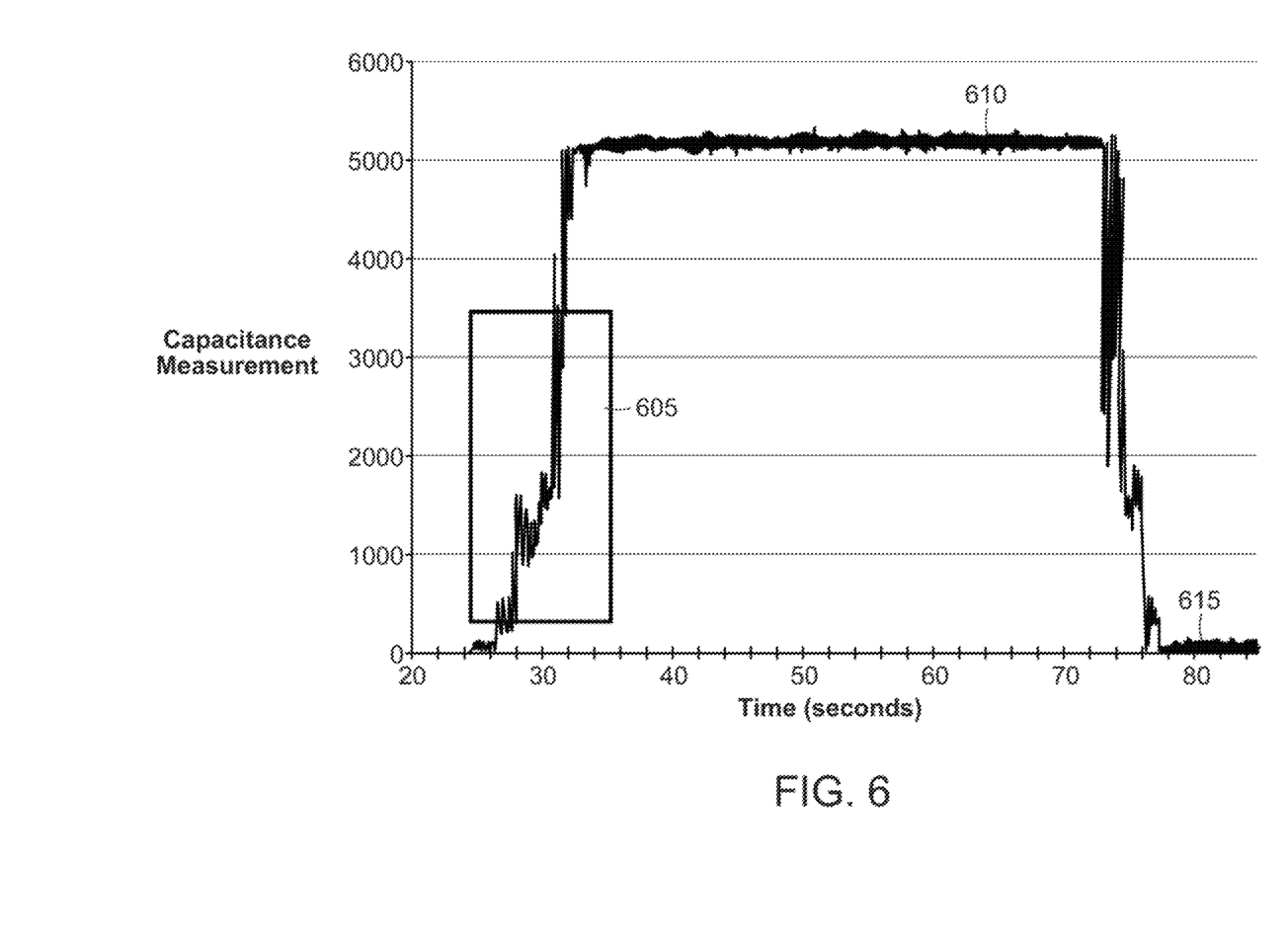
FIG. 6 is a graph representing capacitance values versus time detected during another cyclic fluid discharge event occurring when a T&P valve releases fluid.

FIG. 5 is a graph of the capacitance reading of the sensor electrode 205 through five cycles where a T&P valve releases fluid into the discharge pipe 125 to relieve an over-pressure condition. FIG. 6 is a graph of the capacitance measured by the sensor electrode 205 in which a ramp response 605 from a flow increase due, in this example, to an over-temperature condition, can be seen. Once full flow 610 occurs, the capacitance value is essentially constant. As the flow returns to no flow 615, i.e., the T&P valve closes, the capacitance returns to the lower no flow reading 615.

Referring to the graphs in FIGS. 5 and 6, it is clear that the sensor assembly of the present disclosure can detect an initial leak event that is occurring. It has been observed that, during this initial time, the relief valve produces a stream of fluid that engulfs under a quarter of the inner surface area of the discharge tube 125. As the release event continues, however, the flow increases and fluctuates until it develops into a full flow covering most of the inner surface are of the discharge tube 125. Advantageously, the fluid detection assembly generates three readings: no flow, some flow, i.e., the first continuous stream, and full flow, i.e., a full discharge state.

It should be noted that the release event presented in FIG. 6 is an over-temperature event, which is believed to present the changing capacitance as a ramp input onto the sensor electrode 205. In contrast, the over-pressure event shown in FIG. 5 presents like a step input. The rise time during a pressure relief event is minimal as the seat of the T&P valve would reach its full open position very quickly. Even with a relatively fast closure of the relief valve, there is a drip region as the water leaves the valve. This difference can be utilized in a feedback mechanism to control either the pressure or the temperature response.

Furthermore, this difference in the rate of change allows for aspects of the present disclosure to be used to diagnose other parts of the water system, for example, the thermal expansion tank. Accordingly, for example, if a thermal expansion tank has a ruptured bladder that causes the T&P valve to open wider pressure, and this is occurring cyclically, that could be indicative of an expansion tank problem.

Figure 7A:
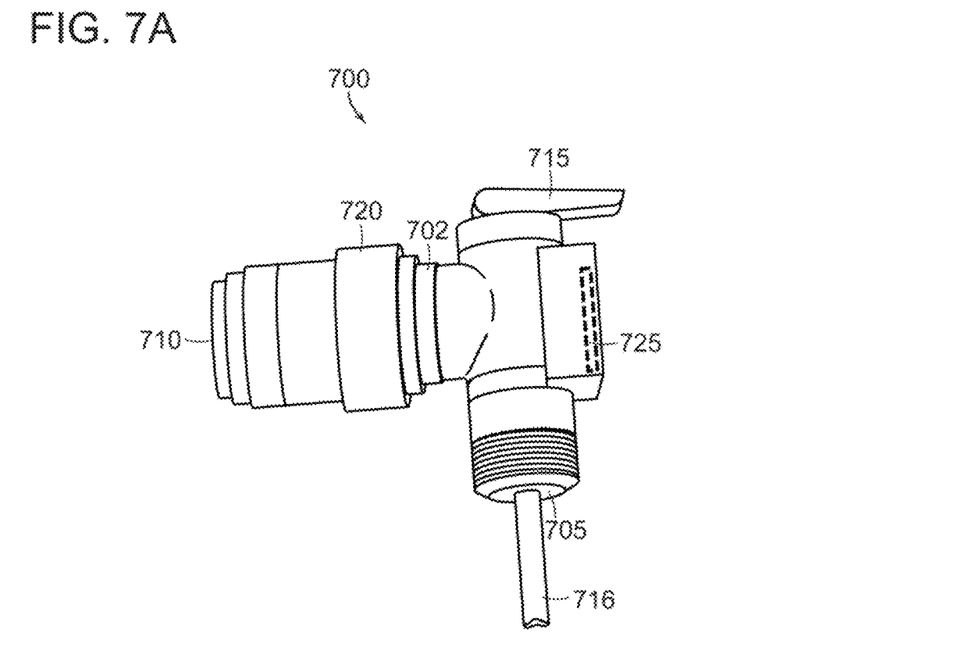
FIG. 7A is a fluid discharge event detection apparatus in accordance with an aspect of the present disclosure.
Figure 7B:
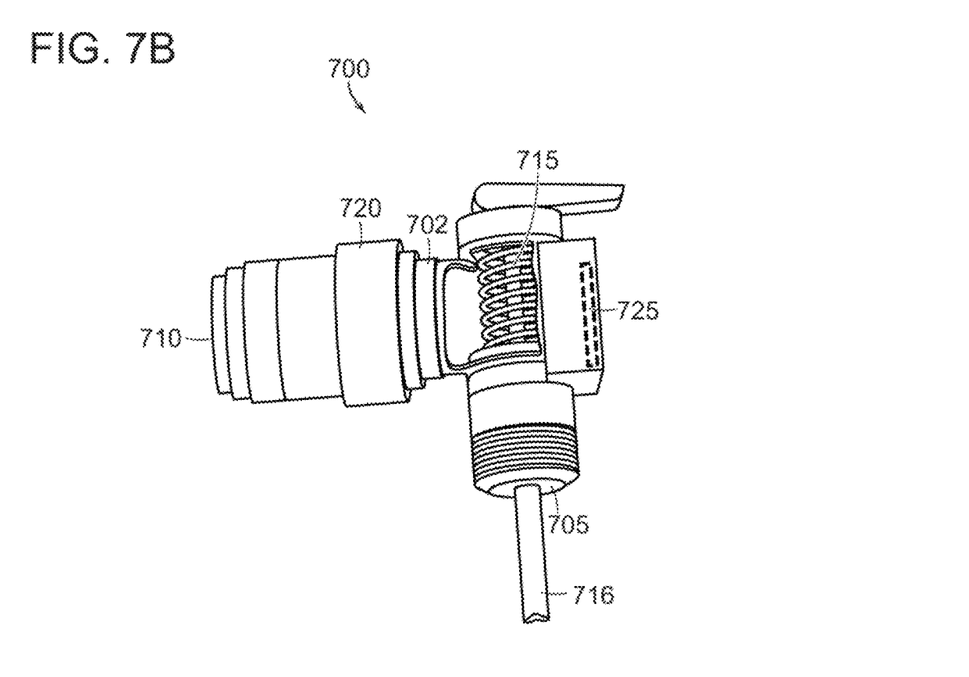
FIG. 7B is a partial cutaway view of the fluid discharge event detection apparatus of FIG. 7A.
Figure 7C:
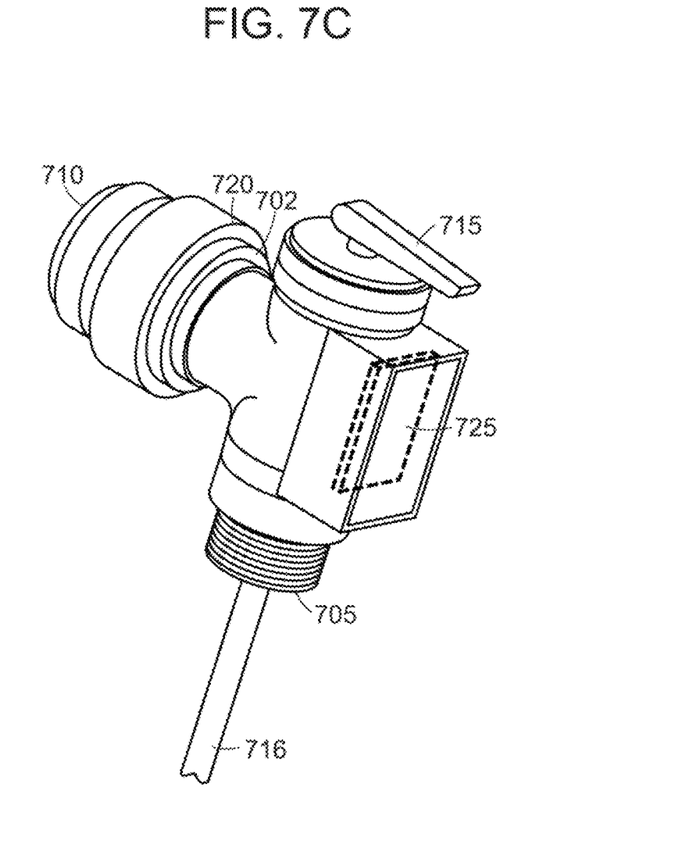
FIG. 7C is another view of the fluid discharge event detection apparatus in FIGS. 7A and 7B.
Figure 8A:
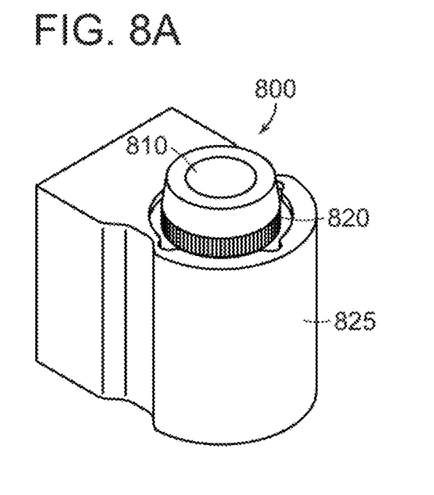
FIGS. 8A-8D show an additional exemplary embodiment of a fluid discharge event detection apparatus in accordance with an aspect of the present disclosure for attachment to either a T&P relief valve or a discharge pipe.
Figure 8B:
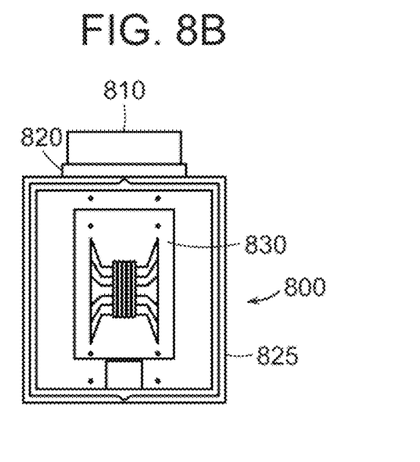
Figure 8C:
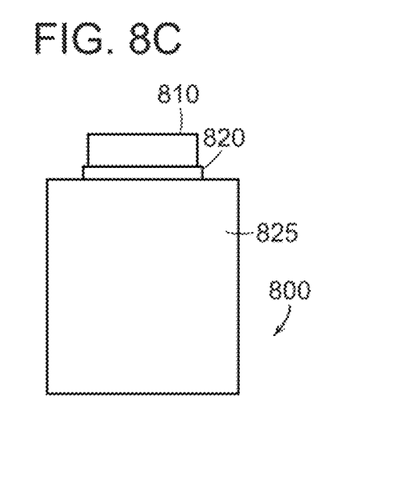
Figure 8D:
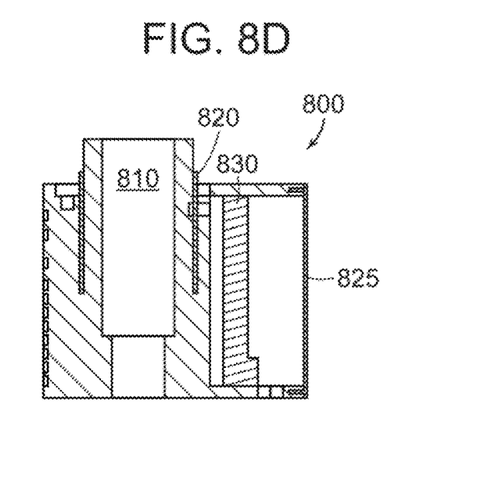
Figure 9A:
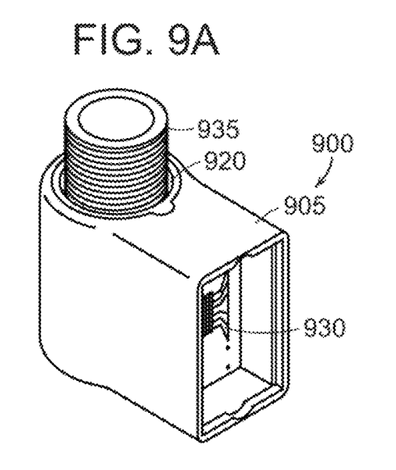
FIGS. 9A-9D show another exemplary embodiment of a fluid discharge event detection apparatus constructed in accordance with an aspect of the present disclosure for attachment to either a T&P relief valve or a discharge pipe.
Figure 9B:
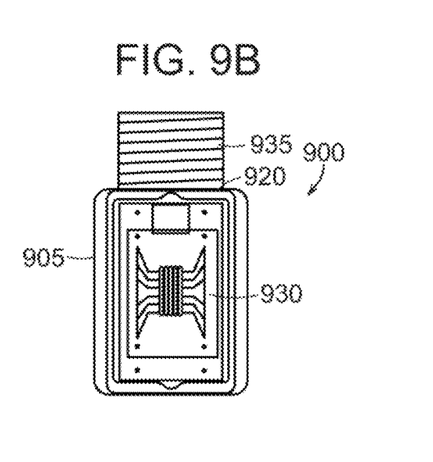
Figure 9C:
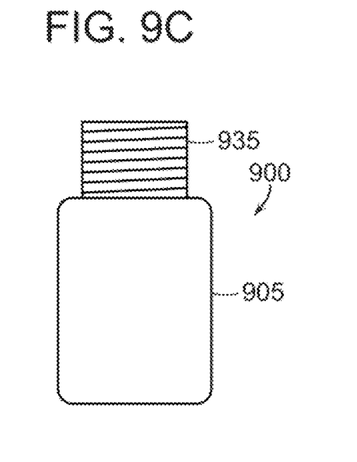
Figure 9D:
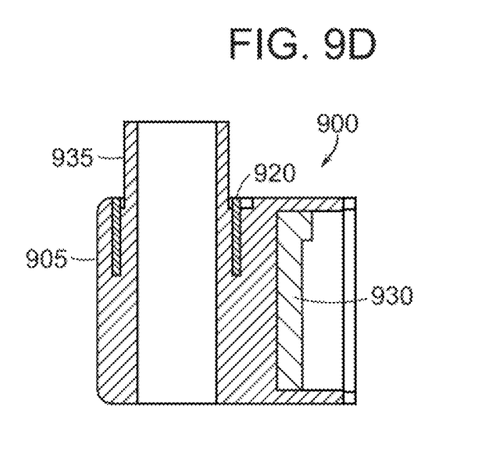

Referring now to FIGS. 7A-7C, a fluid discharge event detection apparatus 700 in accordance with an aspect of the present disclosure comprises a housing 702, a first conduit 705, a second, sensing conduit 710 and a control valve 715, coupled between the first conduit 705 and the sensing conduit 710. The control valve 715 is configured to activate and fluidly couple the first conduit 705 and the sensing conduit 710 to one another when the control valve 715 detects at least one predetermined condition of a fluid within the first conduit 705. The valve 715 can be, for example, a T&P valve 120 and can include a thermal actuator 716 similar to the thermal actuator 164 as described above. A sensor electrode 720 is disposed about the sensing conduit 710 and a controller 725 is coupled to the sensor electrode 720.

As set forth above, the controller 725 is configured to: measure a capacitance value of the sensing conduit 710; detect a change in the sensing conduit capacitance value; and assert an alarm condition upon detection of the change in the sensing conduit capacitance value.

The sensing conduit 710 can be coupled to an extension pipe and the first conduit 705 can be coupled to, for example, a hot water heater tank; a boiler, a backflow relief valve; a fire sprinkler apparatus or the like.

Referring now to FIGS. 8A-8D, an exemplary embodiment of an apparatus 800 for detecting a fluid discharge event in accordance with an aspect of the present disclosure is presented. The apparatus 800 is configured for attachment to either a T&P relief valve or its discharge pipe via a conduit 810. This embodiment includes a sensor electrode 820 integrated into a housing 825 that also encloses a controller 830 as set forth above.

Another fluid discharge event detector 900 is shown in FIGS. 9A-9D in accordance with an aspect of the present disclosure for attachment to either a T&P relief valve or its discharge pipe. Similar to the detector 800 shown in FIGS. 8A-8D, this embodiment includes a housing 905 with a sensor electrode 920, and a controller 930 as set forth above. As can be seen, the housing 905 includes a threaded nipple 935 for coupling into a fluid system. The housing 905, of course, may include any desired coupling as may be needed for a particular application.

For all of the sensor electrodes discussed herein, a larger sensor will allow for a higher resolution. The device can only pick up the capacitance via the time delay, and the added capacitance of the water will create a comparable time delay regardless of the capacitance of the sensor. That being said, the device only needs to be designed so that the SNR is adequate for the desired application; i.e., a 1 inch length of metal for the T&P valve is more than sufficient, and likewise can be said for the 2 inch application.

In one aspect of the disclosure, sensor assemblies in accordance with the subject technology can be powered by a battery and/or have the option to be wired to a power source.

The fluid detection assembly may include wired and/or wireless communications to notify of leaks and full discharge.

It will be appreciated by those of ordinary skill in the pertinent art that the functions of several elements may, in alternative embodiments, be carried out by fewer elements, or a single element. Similarly, in some embodiments, any functional element may perform fewer, or different, operations than those described with respect to the illustrated embodiment. Also, functional elements (e.g., modules, databases, interfaces, computers, servers and the like) shown as distinct for purposes of illustration may be incorporated within other functional elements in a particular implementation.

While the subject technology has been described with respect to various embodiments, those skilled in the art will readily appreciate that various changes and/or modifications can be made to the subject technology without departing from the spirit or scope of the disclosure as defined by the claims asset forth herein.

What is claimed is:

1. A temperature and pressure relief apparatus comprising:
    a body having a first conduit configured to connect to a water heater, and a second conduit configured to connect to a discharge pipe; and
    a relief valve positioned between the first and second conduits and normally biased into a closed position to prevent flow between the first conduit and the second conduit, wherein the relief valve is configured such that when a temperature or pressure within the water heater exceeds a predetermined level, the valve member opens to relieve pressure and, in turn, water is released through the second conduit;
    a sensor disposed about the second conduit; and
    a controller, coupled to the sensor, configured to:
        measure a capacitance value of the second conduit;
        detect a change in the capacitance value indicating a presence of water in the second conduit; and
        assert an alarm condition upon detection of the change in the second conduit capacitance value,
    wherein the relief valve includes a valve member and further comprises an expandable thermal actuator secured in the first conduit so that a first end of the expandable thermal actuator engages the valve member and a second end of the expandable thermal actuator extends into the water heater, the expandable thermal actuator configured such that when the temperature within the water heater exceeds the predetermined level, the expandable thermal actuator expands and overcomes the bias on the valve member to open the valve member and allow water to escape through the second conduit.

2. The temperature and pressure relief apparatus of claim 1, wherein the relief valve is biased into the closed position by a compression spring.

3. The temperature and pressure relief apparatus of claim 2, wherein the relief valve includes a valve member and the valve member is centrally affixed to a valve stem, the valve stem positioned parallel to the first conduit.

4. The temperature and pressure relief apparatus of claim 3, further comprising a handle affixed to the body of the temperature and pressure relief valve, the handle configured to move the valve member to an open position for manual testing of the controller.

5. The temperature and pressure relief apparatus of claim 4, wherein the first conduit and second conduit are positioned orthogonal relative to each other such that the body of the temperature and pressure relief valve is L-shaped and the sensor is integral to the body.

6. The temperature and pressure relief apparatus of claim 1, wherein the predetermined level is a temperature threshold of 212 degrees Fahrenheit.

7. The temperature and pressure relief apparatus of claim 1, wherein the controller is further configured to distinguish between an excess temperature condition and an excess pressure condition as a function of a detected rate of change of the capacitance value of the second conduit.

8. A temperature and pressure relief apparatus comprising:
    a housing defining:
        a first conduit that connects to a fluid network; and
        a discharge pipe;
    a relief valve assembly in the housing and having a valve member normally biased into a closed position to prevent flow between the first conduit and the discharge pipe, the valve member configured such that when a temperature or pressure within the fluid network exceeds a predetermined level, the relief valve allows water to escape through the discharge pipe;
    a fluid detection assembly including: a sensor integral to the housing downstream of the relief valve without creating a flow restriction therein; and a controller, coupled to the sensor, configured to: measure a capacitance value of the discharge pipe; detect a change in the capacitance value; and assert an alarm condition upon detection of the change in the capacitance value; and
    a thermal actuator secured in the first conduit so that a first end of the thermal actuator engages the valve member and a second end of the thermal actuator extends into the water heater, the thermal actuator configured such that when the pressure or temperature within the water heater exceeds the predetermined level, the thermal actuator expands and overcomes the bias on the valve member to open the valve member and allow water to escape through the discharge pipe.

9. The temperature and pressure relief apparatus of claim 8, wherein the valve member is biased into the closed position by a compression spring.

10. The temperature and pressure relief apparatus of claim 8, wherein the valve member is centrally affixed to a valve stem, the valve stem positioned parallel to the first conduit.

11. The temperature and pressure relief apparatus of claim 10, further comprising a handle affixed to a valve stem of the temperature and pressure relief valve, the handle configured to move the valve member to an open position for manual testing of the temperature and pressure relief valve.

12. A temperature and pressure relief valve apparatus comprising:
a housing having: an inlet configured to couple to a tank for ingress of fluid; a sensing outlet for egress of fluid; and a control valve coupled between the inlet and the sensing outlet and configured to be normally closed but open for releasing fluid from the tank upon predetermined conditions of a fluid within the tank;
a sensor assembly coupled to the sensing outlet without creating a flow restriction or coming in contact with fluid in the sensing outlet; and
a controller, coupled to the sensor assembly, configured to:
continuously measure a capacitance value of the sensing outlet using the sensor assembly, the capacitance value being a function of an inner surface area of the sensing outlet being covered with fluid;
detect a change in the sensing outlet capacitance value;
assert at least two alarm conditions upon detection of the change in the sensing outlet capacitance value; and
modify a feedback mechanism based upon the at least two alarm conditions and the at least two alarm conditions include conditions selected from a group consisting of: a slow drip condition; a fully flowing condition; a dry condition; a cyclically opening condition; a ramp up condition; and a step up condition.

13. The temperature and pressure relief valve apparatus of claim 12, wherein the sensor assembly includes an electrode that is a circular ring surrounding the sensing outlet and further comprises a handle affixed to the housing and coupled to the control valve, wherein the handle is configured to open the control valve for manual testing.

14. The temperature and pressure relief valve apparatus of claim 13, wherein: the sensing outlet and fluid therein are coupled to ground and the electrode is a capacitive electrode; sensitivity of the capacitive electrode is adjustable by changing an electrical resistance coupled thereto; and wherein the capacitive electrode is integrated into the housing.

15. The temperature and pressure relief valve apparatus of claim 12, wherein the controller is further configured to distinguish between an excess temperature condition and an excess pressure condition as a function of a detected rate of change of the capacitance value, and the detected rate of change is a function of a flow rate of fluid within the sensing outlet.

16. A temperature and pressure relief valve apparatus comprising:
a housing having: an inlet configured to couple to a tank for ingress of fluid; a sensing outlet for egress of fluid; and a control valve coupled between the inlet and the sensing outlet and configured to be normally closed but open for releasing fluid from the tank upon predetermined conditions of a fluid within the tank;
a sensor assembly coupled to the sensing outlet without creating a flow restriction or coming in contact with fluid in the sensing outlet, the sensor assembly including an electrode that is a circular ring surrounding the sensing outlet and further comprises a handle affixed to the housing and coupled to the control valve, wherein the handle is configured to open the control valve for manual testing; and
a controller, coupled to the sensor assembly, configured to:
continuously measure a capacitance value of the sensing outlet using the sensor assembly, the capacitance value being a function of an inner surface area of the sensing outlet being covered with fluid;
detect a change in the sensing outlet capacitance value; and
assert at least two alarm conditions upon detection of the change in the sensing outlet capacitance value,
wherein the sensing outlet and fluid therein are coupled to ground and the electrode is a capacitive electrode; sensitivity of the capacitive electrode is adjustable by changing an electrical resistance coupled thereto; and wherein the capacitive electrode is integrated into the housing.

17. The temperature and pressure relief valve apparatus of claim 16, wherein the controller is further configured to distinguish between an excess temperature condition and an excess pressure condition as a function of a detected rate of change of the capacitance value, and the detected rate of change is a function of a flow rate of fluid within the sensing outlet.

* * * * *